(12) United States Patent
Crickmore et al.

(10) Patent No.: US 10,198,946 B2
(45) Date of Patent: Feb. 5, 2019

(54) TRAFFIC MONITORING

(71) Applicant: OPTASENSE HOLDINGS LIMITED, Farnborough, Hampshire (GB)

(72) Inventors: Roger Crickmore, Farnborough (GB); David Hill, Farnborough (GB); Jon Richards, Farnborough (GB); Richard Martin, Farnborough (GB); Magnus McEwen-King, Farnborough (GB)

(73) Assignee: OPTOSENSE HOLDINGS LIMITED (GB)

( * ) Notice: Subject to any disclaimer, the term of this patent is extended or adjusted under 35 U.S.C. 154(b) by 0 days.

(21) Appl. No.: 14/786,584

(22) PCT Filed: Apr. 25, 2014

(86) PCT No.: PCT/GB2014/051306
§ 371 (c)(1),
(2) Date: Oct. 23, 2015

(87) PCT Pub. No.: WO2014/174318
PCT Pub. Date: Oct. 30, 2014

(65) Prior Publication Data
US 2016/0078760 A1    Mar. 17, 2016

(30) Foreign Application Priority Data
Apr. 26, 2013 (GB) .................................. 1307542.9

(51) Int. Cl.
*G08G 1/04* (2006.01)
*G01H 9/00* (2006.01)
(Continued)

(52) U.S. Cl.
CPC .............. *G08G 1/04* (2013.01); *G01H 9/004* (2013.01); *G08G 1/015* (2013.01); *G08G 1/0116* (2013.01); *G08G 1/0125* (2013.01)

(58) Field of Classification Search
None
See application file for complete search history.

(56) References Cited

U.S. PATENT DOCUMENTS

| 5,194,847 | A | | 3/1993 | Taylor et al. |
| 5,446,291 | A | * | 8/1995 | Becker .................. G08G 1/015 |
| | | | | 250/559.24 |

(Continued)

FOREIGN PATENT DOCUMENTS

| CN | 1374806 | 10/2002 |
| CN | 1389820 | 1/2003 |

(Continued)

*Primary Examiner* — Tamara L Weber
(74) *Attorney, Agent, or Firm* — McDonnell Boehnen Hulbert & Berghoff LLP (57) ABSTRACT

The present application relates to road traffic monitoring to detect the number, speed and/or type of vehicles travelling on a road. Noise features (104) are deployed on, or formed in, the surface of a road (101). The noise feature (104) is arranged to generate a characteristic acoustic signature when traversed by the wheels of a vehicle (105) travelling within a lane of the road. A distributed acoustic sensor (102, 103) is deployed to detect occurrences of the characteristic acoustic signature. In some embodiments the noise element may comprise at least two distinct elements (104a, 104b), for instance rumble strips arranged transversely to the road, which are a known distance apart along the road. The acoustic signals from a wheel crossing both elements can be detected and used to determine the vehicle speed. The number of vehicle axles and axle separation can also be determined to categorize the type of vehicle. A plurality of noise features may be located in different lanes of a multi-lane road with noise features in different lanes arranged to generate different characteristic acoustic signatures.

24 Claims, 2 Drawing Sheets

(51) Int. Cl.
    *G08G 1/015*     (2006.01)
    *G08G 1/01*     (2006.01)

(56) References Cited

U.S. PATENT DOCUMENTS

| | | | |
|---|---|---|---|
| 5,878,367 A | | 3/1999 | Lee et al. |
| 6,021,364 A | * | 2/2000 | Berliner ............... G08G 1/01 |
| | | | 340/943 |
| 6,778,717 B2 | | 8/2004 | Tapanes et al. |
| 7,764,363 B2 | | 7/2010 | Hayward et al. |
| 2003/0201909 A1 | * | 10/2003 | Hilliard ............... G08G 1/02 |
| | | | 340/940 |
| 2004/0061628 A1 | * | 4/2004 | Hill ..................... E01F 11/00 |
| | | | 340/942 |
| 2005/0147340 A1 | | 7/2005 | Tapanes |
| 2008/0088846 A1 | | 4/2008 | Hayward et al. |
| 2009/0014634 A1 | | 1/2009 | Sikora et al. |
| 2010/0158431 A1 | | 6/2010 | Huffman et al. |
| 2014/0278030 A1 | * | 9/2014 | Meena ................. G08G 1/015 |
| | | | 701/118 |

FOREIGN PATENT DOCUMENTS

| | | |
|---|---|---|
| CN | 1391195 | 1/2003 |
| CN | 1549224 | 11/2004 |
| CN | 101706997 | 5/2010 |
| WO | WO 02/065426 | 8/2002 |
| WO | WO 07/049004 | 5/2007 |
| WO | WO 2012/072973 | 6/2012 |
| WO | WO 2013/093478 | 6/2013 |

\* cited by examiner

TRAFFIC MONITORING

FIELD OF THE INVENTION

This application relates to apparatus and methods for traffic monitoring, especially for road traffic monitoring using distributed acoustic fibre optic sensing.

BACKGROUND OF THE INVENTION

There are various applications where it is desirable to monitor traffic flow along one or more roads. For instance there may be a desire to determine the amount of traffic on a given part of a road network and/or the flow of the traffic on that part of the network. Such information may be required for implementing adaptive traffic management techniques. For instance variable speed limits may be set according to the volume and flow of traffic on a given stretch of road. The operation of traffic lights or other signal controls to control access to a given section of road may be controlled based on knowledge of the traffic flow at various parts of the network. Contraflow systems or other lane controls may be activated or controlled based on such information.

Additionally or alternatively information about the volume and flow of traffic on various parts of the road network will be of use to traffic managers even if the network or parts thereof do not have active traffic management systems to provide data to allow modelling of any improvements to the general traffic management, such as permanent alterations in speed limits or changes to road markings or signage for example. Collection of data about traffic flow before and after any changes will also be useful to determine how any changes have impacted traffic flow.

Data on traffic flow will also be useful to planners for planning any upgrades or additions to the road network.

Also data on the volume of traffic travelling on sections of the road network may be of interest for those responsible for maintaining the network to allow decisions about regular maintenance based on likely wear.

For many of the applications described above it would therefore be useful not only to monitor the overall volume of traffic and the flow of traffic but also the make-up of the traffic, i.e. the types of vehicles, e.g. heavy goods vehicles/trucks, light commercial vehicles/vans, large passenger cars/SUVs, midsize/compact passenger cars or motorcycles for example. Determining the relative proportion of various types of vehicles may also be useful for control, planning and maintenance purposes.

Various types of road traffic monitoring systems exist.

Pressure or strain based sensors, for instance based on piezoelectric sensors or pneumatic hoses, may be laid, or embedded, across a carriageway and monitored to detect the weight of a vehicle crossing over the sensor. Such sensors will effectively act as axle counters and can be arranged to monitor volume of traffic and flow rate at a given point and also estimate generally the type of vehicle. Such sensors are useful and relatively simple but each carriageway of a multi-lane highway will require its own sensor and multiple sensors will be required at different points along a traffic network in order to be able to monitor traffic along the network. Sensor strips or hoses laid across the surface of a road will be subject to relatively severe wear and tear requiring robust sensors and/or regular maintenance. Sensors embedded within a highway will be less exposed but will typically require more work to be installed and are much harder to access for repair or maintenance.

Inductive sensors can be used based on induction loops embedded within the carriageway. Passage of a vehicle produces eddy currents which can be detected. Induction loop traffic sensors are widely used in a range of applications and can provide information about traffic volume and flow and an estimate of vehicle type. Again however a separate induction loop must be provided for each lane of a multi-lane highway and multiple sensors along the road must be used to provide information about general traffic flow along the network. The sensors are embedded within the carriageway with the associated costs and inconvenience of installation and difficulty of maintenance.

Magnetic sensors using embedded magnetic detectors have also been proposed but have similar issues to inductive sensors.

Radar based sensors, for instance microwave radars, have also been used. The radar system may be mounted on an overhead gantry or bridge to transmit pulses of radiation along a lane of a carriageway. Returns from vehicles can be detected and the speed of the vehicle detected—either from a Doppler shift or by tracking the movement along the lane. Lidar based systems, e.g., IR based lidar, may use a similar approach or may simply scan for vehicles crossing under a scanned area. Such sensors may be relatively expensive however and need to be mounted with a good view of the road to be monitored which, as mentioned may require the presence of overhead structures—which may be not be available in various parts of the network.

Increasingly video processing is being used for traffic monitoring. Video images of the road network may be observed by control personnel to get a feel for the current traffic conditions to allow control decisions to be made but automatic image processing may also allow automatic detection of volume and flow of traffic. Image processing techniques such as pattern recognition and edge detection may be used to identify and track vehicles and potentially categorise the type of vehicle. In addition automatic number plate recognition may be applied to identify the number plate/licence plate of the vehicle. This can allow more sophisticated tracking of individual vehicles around the traffic network and, with access to a database of vehicle registrations, the type of vehicle can be identified from identifying the number plate. However again this requires multiple relatively high quality cameras positioned with good views of the roads to be monitored.

GPS based traffic monitoring has also been proposed, the idea being that at least some vehicles are equipped with a GPS tracker and a transmitter so as to transmit information about their location and speed to a central server. In theory the GPS equipment could be a requirement for every vehicle but in practice the system may possibly make use of any GPS device that the driver may possess, such as a navigational aid or smartphone, or provide dedicated GPS equipment to just a proportion of the vehicles that regularly travel on the road network of interest. With enough vehicles transmitting data it will be possible to monitor general flow rates of traffic on various parts of the network. However such methods are likely to be of limited use in low traffic volumes, may not provide enough accuracy to determine lane usage of a multi-lane road and may struggle in tunnels or mountainous regions where the GPS signals may be lost. This approach may also require vehicle owners to consent to being tracked.

SUMMARY OF THE INVENTION

Embodiments of the present invention thus provide methods and apparatus for traffic monitoring, especially road traffic monitoring, that at least mitigate at least some of the above mentioned disadvantages.

Thus according to the present invention there is provided a method of monitoring road traffic moving on a road comprising:
- interrogating an optical fibre with optical radiation to provide distributed acoustic sensing so as to generate an acoustic measurement signal from each of a plurality of sensing portions of said optical fibre;
- wherein at least one of said sensing portions of said optical fibre is located in the vicinity of a known noise feature located on or formed in the surface of the road in a known location; and
- wherein said noise feature is configured to produce a characteristic acoustic signature when traversed by a wheel of a road vehicle, and
- the method comprises detecting vehicles passing over said noise feature by analysing said acoustic measurement signal from said at least one sensing portion located in the vicinity of the known noise feature to detect occurrences of said characteristic acoustic signature.

The noise feature may comprise at least one raised or patterned feature located on or formed in the surface of the road and may, for instance, comprise one or more rumble strips arranged transversely to the road direction.

The method may comprise the step of associating occurrences of said characteristic acoustic signature with an axle of a road vehicle. The method may then identify the number of axels of said road vehicle which can be used in categorising the type of vehicle.

The noise feature may comprise at least first and second noise elements spaced apart from one another along the road by a known first distance, wherein each of said first and second elements is configured to generate a distinct sound when traversed by a wheel of a road vehicle. The method may then comprise identifying first and second acoustic signals respectively generated by the wheel or wheels of a given vehicle axle traversing the first and second noise elements. The method may also comprise determining the speed of the vehicle based on the time difference between said first and second acoustic signals. The distance between axles of road vehicles may then be determined based on the time between occurrences of said characteristic acoustic signature generated by the wheels of different axles of said road vehicle and said determined speed which can be used to categorise the type of road vehicle.

The method may additionally or alternatively comprise determining the acoustic intensity of said characteristic acoustic signature which can also be used to categorise the type of road vehicle.

There may be a plurality of known noise features located on or formed in the surface of the road in different known locations and the method may comprise detecting occurrences of the characteristic acoustic signature from any of the plurality of known noise features. There may be a plurality of noise features located at different locations along the length of the road with the optical fibre is deployed along the path of the road. The characteristic acoustic signatures from different noise features at different locations along the length of the road may be detected by different sensing portions of the optical fibre. At least one noise features may be located before a junction and at least one noise feature located after a junction.

At least some of the plurality of noise features may be configured to produce different characteristic acoustic signatures to one another. The method may comprise identifying the particular characteristic acoustic signature so as to detect the relevant noise features which a vehicle has traversed. At least some of the noise features may each comprise a plurality of noise elements spaced apart from one another along the road, each noise element being configured to generate a distinct sound when traversed by a wheel of a road vehicle. At least some noise features may have different spacing of noise elements from one another to generate said different characteristic acoustic signatures. At least some noise features may have different numbers of noise elements from one another to generate said different characteristic acoustic signatures. At least some noise features may have different types of noise elements from one another to generate different distinct sounds when traversed, which may comprise sounds of different intensity, duration and/or acoustic frequency.

At least part of the road monitored may be a multi-lane road and at least some of said noise features generating different characteristic acoustic signatures may be located in different lanes from one another. The method may then comprise identifying the particular characteristic acoustic signature to determine which lane a vehicle is travelling in. The road may comprises at least first and second lanes with a first plurality of noise features each producing a first characteristic acoustic signature located at intervals along the first lane and a second plurality of noise features each producing a second characteristic acoustic signature located at intervals along the second lane. Additionally or alternatively there may be a plurality of noise features located along the path of each lane. The spacing between adjacent noise features may be different in each lane.

In another aspect of the invention there is provided a system for monitoring traffic movement on a road comprising:
- a distributed fibre optic sensor apparatus for interrogating an optical fibre with optical radiation to provide distributed acoustic sensing so as to generate an acoustic measurement signal from each of a plurality of sensing portions of said optical fibre; and
- at least one known noise feature located on or formed in the surface of the road in a known location;
- wherein said noise feature is configured to produce a characteristic acoustic signature when traversed by a wheel of a road vehicle, and
- wherein at least one of said sensing portions of said optical fibre is located in the vicinity of said known noise feature;
- the system further comprising a processor for processing the acoustic measurement signal from the at least one sensing portion located in the vicinity of said known noise feature to detect occurrences of said characteristic acoustic signature so as to detect vehicles passing over said noise feature.

All of the various method features and options described above may be implemented in the system of this aspect of the invention.

Aspects of the invention also relate to the processing of data acquired from a distributed acoustic sensor in the vicinity of a suitable noise feature. Thus in a further aspect of the invention there is provided a method of processing data collected from at least one sensing portion of a distributed acoustic sensor deployed in the vicinity of a noise feature in a known location in a road, the method comprising analysing said data to detect occurrences of a characteristic acoustic signature associated with a vehicle traversing said noise feature.

The data may be acquired from at least one sensing portion deployed in the vicinity of a noise feature having at least two noise elements spaced apart along the road by a known distance and the method may comprises identifying first and second acoustic signals respectively generated by the wheel or wheels of a given vehicle axle traversing the first and second noise elements and determining the speed of the vehicle based on the time difference between said first and second acoustic signals. The method may further comprise determining the distance between axles of road vehicles based on the time between occurrences of said characteristic acoustic signature generated by the wheels of different axles of said road vehicle and said determined speed.

The data may be acquired from at least one sensing portion deployed in the vicinity of a plurality of noise features wherein at least some of the plurality of noise features are configured to produce different characteristic acoustic signatures to one another and the method comprises identifying the particular characteristic acoustic signature so as to detect the relevant noise features which a vehicle has traversed.

Embodiments of the invention may be implemented by computer software and in another aspect of the invention there is provide a computer software programme (which may be stored on a non-transitory storage medium) which, when run on a suitable computer causes said computer to implement any of the methods described above or implement the processor of the system described above.

The invention also provides a processor for processing data collected from at least one sensing portion of a distributed acoustic sensor deployed in the vicinity of a noise feature in a known location in a road, the processor being configured to analyse said data to detect occurrences of a characteristic acoustic signature associated with a vehicle traversing said noise feature.

DESCRIPTION OF THE DRAWINGS

The invention will now be described by way of example only with respect to the following drawings, of which.

DESCRIPTION OF THE INVENTION

Embodiments of the present invention relate to traffic monitoring apparatus and methods. One embodiment of the invention relates to a system for monitoring traffic movement on a road comprising a distributed fibre optic sensor apparatus for interrogating an optical fibre with optical radiation to provide distributed acoustic sensing so as to generate an acoustic measurement signal from each of a plurality of sensing portions of said optical fibre and at least one known noise feature located on or formed in the surface of the road in a known location within at least one lane of the road. The noise feature is configured to produce a characteristic acoustic signature when traversed by a wheel of a road vehicle. At least one of the sensing portions of the optical fibre is located in the vicinity of the known noise feature. A processor is configured to process the acoustic measurement signal from the sensing portion(s) located in the vicinity of the known noise feature(s) to detect occurrences of said characteristic acoustic signature so as to detect vehicles passing over said noise feature.

Embodiments of the present invention thus make use of fibre optic distributed acoustic sensing to provide traffic monitoring by listening for characteristic sounds produced by road traffic as it traverses deliberately introduced noise features in or on the surface of the road.

Distributed acoustic sensing (DAS) is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the intensity of disturbance of the fibre at that sensing portion. Thus the DAS sensor effectively acts as a linear sensing array of acoustic sensing portions of optical fibre. The length of the sensing portions of fibre is determined by the characteristics of the interrogating radiation and the processing applied to the backscatter signals but typically sensing portions of the order of a few meters to a few tens of meters or so may be used. As used in this specification the term "distributed acoustic sensing" will be taken to mean sensing by optically interrogating an optical fibre to provide a plurality of discrete acoustic sensing portions distributed longitudinally along the fibre and the term "distributed acoustic sensor" shall be interpreted accordingly. The term "acoustic" shall mean any type of pressure wave or mechanical disturbance that may result in a change of strain on an optical fibre and for the avoidance of doubt the term acoustic be taken to include ultrasonic and subsonic waves as well as seismic waves.

In embodiments of the present invention a DAS sensor may be used to provide a detection capability with low cost passive features on the surface of the road used to generate a characteristic acoustic signature when traversed by a vehicle.

Figure 1A:
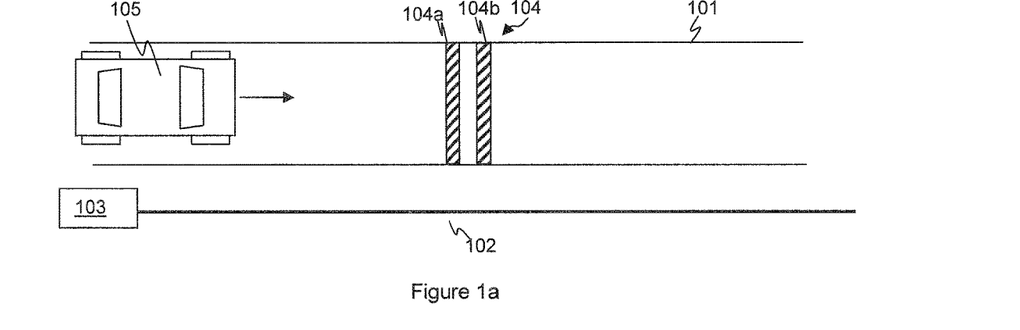
FIGS. 1a and 1b illustrates a traffic monitoring system according to the present invention and an illustrative response from such a system.

FIG. 1a illustrates an embodiment of the present invention illustrating the basic principles. FIG. 1a shows a section of road 101 where it is wished to monitor traffic flow. A fibre optic cable 102 is thus deployed alongside the length of the road and interrogated by interrogator unit 103 to provide distributed acoustic sensing. Formed on or in the surface of the road within at least one lane of the road is a noise feature 104. Noise feature 104 is arranged to generate a characteristic acoustic signature when traversed by the wheel(s) of a road vehicle 105.

The noise feature may conveniently be formed from one or more patterned or raised areas of the road surface and in particular may comprise one or more rumble strips deployed transversely across the carriageway. Rumble strips (sometime called sleeper lines) are well known pieces of road furniture which are often provided at the side of carriageways to provide an alert to a driver of a vehicle that starts to leave the road, perhaps due to inattention or tiredness of the driver. When a vehicle passes over the rumble strip the wheels passing over the strip will generate an audible sound of a different character, and greater intensity, than the normal road noise of the vehicle tyres on a flat road. The normal use of rumble strips is thus at the edge of the carriageway to define the outside of the lane within which vehicles travel. In embodiments of the present invention the rumble strips are deployed so as to be traversed by traffic travelling within a lane of the road. Thus the noise features of embodiments of the present invention are arranged to extend at least part of the way across a lane of a road. Thus at least part of the noise feature is within a lane of the road whereas a conventional rumble strip delineates the edge of one lane and is outside a lane.

As shown in FIG. 1a the noise feature 104 may thus comprise at least one rumble strip. Deployed transversely as shown this will lead to a relatively short but intense sound when the wheels of a vehicle pass over the rumble strip. This sound can be detected by the DAS sensor and used as an indication that a vehicle has passed over the rumble strip. Continually detecting the sounds generated by vehicle wheels passing over the rumble strip will thus allow continuous monitoring of the number of vehicles passing that particular location.

The noise feature 104 in the example of FIG. 1a has two noise elements 104a and 104b, e.g. two rumble strips, spaced apart from one another along the road, i.e. longitudinally, by a known first distance. The first and second elements are arranged so that each generates a distinct sound when traversed by a wheel of a road vehicle, i.e. the sound of a wheel passing the first rumble strip 104a can be distinguished from the sound of a wheel passing the second rumble strip 104b.

This arrangement has at least two advantages. First a vehicle passing will thus generate two sounds as the wheel (s) of an axle pass over the two rumble strips. For the expected range of vehicle speeds there two distinct sounds will be relatively close together in time. Thus the characteristic acoustic signature can be seen, in this example, as two sounds closely spaced in time. For two rumble strips of the same construction the two sounds from a given axle are likely to be relatively similar in intensity and other acoustic characteristics such as acoustic frequency spectrum.

Detecting two closely spaced acoustic signals will help avoid false alarms generated by background noise. In addition however by detecting the times at which the wheel(s) of a given axle traverse the two noise elements which are a known distance apart the vehicle speed can be determined.

Figure 1B:
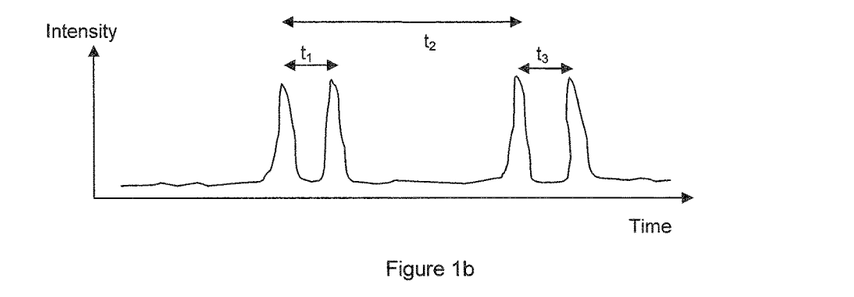

FIG. 1b illustrates an example acoustic measurement signal detected by one or more sensing portions of the optical fibre in the vicinity of the noise feature 104 when the car 105 traverses the rumble strips of the noise feature. A first pair of relatively intense acoustic signals will be detected as the wheels of the front axle of the vehicle cross the first and then the second rumble strip respectively. A short time later a second pair of acoustic disturbances will be detected as the wheels of the rear axle cross the two rumble strips.

This produces a characteristic plot of four spikes in intensity in a relatively short time indicative of a two-axle vehicle having traversed the noise feature. The processor of the DAS sensor can thus monitor the acoustic measurement signal of the sensing portion(s) in the vicinity of the noise feature to detect occurrences of such a signal and thus detect a vehicle having crossed the rumble strips.

In this arrangement the separation between the two noise elements, e.g. rumble strips 104a and 104b, is less than the separation between the front and rear vehicle axles. Thus the front axle crosses both rumble strips before the rear axle crosses the rumbles strips. In this case it can be seen that the first two intensity spikes detected correspond to the first axle. Given the spacing between the rumbles strips 104a and 104b is known the time separation $t_1$ between these two acoustic intensity peaks can be used to determine the vehicle speed. Equally however it can be seen that the third and fourth peaks correspond to the rear axle and the time $t_3$ between these peaks could equally be used to determine vehicle speed. The time between each set of peaks may be determined and used in determining the vehicle speed (assuming the vehicle is travelling at a relatively constant speed in the time take to cross the two rumble strips.

Having determined the vehicle speed it is also possible to determine the distance separation between vehicle axles by looking at the time difference $t_2$ between the first peak due to the front axle and the first peak due to the rear axle (or additionally or alternatively the time difference between the second peaks due to the front and rear axles respectively), again assuming relatively constant vehicle speed.

The discussion above has assumed that the separation between the rumble strips is less than the separation between axles. This could be achieved by using a spacing lower than the minimum axle spacing of the vehicles it is wished to detect. For two-axle road vehicles motorcycles may have the typical minimum axle spacing and a separation of the rumble strips of about a meter or less may be sufficient. However the method will work just as well if the two rumble strips are separated by a distance greater than the spacing of at least some vehicle axles. Assuming the vehicle is travelling at a constant speed there will be two acoustic intensity peaks at a first time separation due to the wheels of one axle and two intensity peaks at the same time separation due to the wheels of another axle. The processor may therefore analyse the intensity peaks to associate those due to the wheels of each axle and then look at the time separation of the relevant peaks to determine the vehicle speed. For larger vehicles with more than two axles there may be additional intensity peaks with the same time separation. The processor may therefore associate occurrences of said characteristic acoustic signature with an axle of a road vehicle and/or identify the number of axles of said road vehicle.

It will therefore be clear that based on a knowledge of the vehicles speed it is possible to determine the axle separation by looking at the acoustic signals generated from a single noise element, e.g. a single rumble strip. In some embodiments it may be possible to determine the vehicle speed by tracking the general road noise of the vehicle as it moves past a plurality of sensing portions of the optical fibre. As the vehicle moves on the road it will, even in the absence of noise features, generate some noise which will be most intense nearer to the vehicle. If the optical fibre used for DAS is deployed along the path of the road this noise will be seen to move from sensing portion to sensing portion of the optical fibre as the vehicle moves. Thus detecting this general noise may be used to detect and track vehicles on the road. Thus the speed of a vehicle approaching a noise feature could be determined by tracking the general noise made by the vehicle as it moves along the road. Crossing the noise feature will then generate distinct and relatively intense noise, above the general road noise, which can be separated detected by an appropriate sensing portion of the DAS sensor. In this case even the acoustic response from a single noise feature will be sufficient to determine the number of axles and/or also the axle separation.

Based on the determined number of axles of the vehicle and/or the separation between the vehicle axles the type of vehicle having crossed the noise feature may be determined.

For example the axle separation may be used to categorise the vehicle based on typical axle separations for various types of vehicle, for example the vehicle may be classified as a motorcycle, small car, midsize car, large car, small van, large van, truck etc. The number of axles may also be used to categorise the type of vehicle. In some instances the relative intensity of the acoustic signals detected may depend on the type of vehicle—larger heavier vehicles with larger tyres may for instance generate more intense acoustic signals than smaller vehicles and thus relative intensity may also be taken into account.

This embodiment of the present invention thus provides the ability to monitor a given section of road to determine the volume of traffic (by counting the number of vehicles passing the noise feature), the flow of traffic (by determining vehicle speed and possibly the time between successive vehicles) and also determine the make-up or constitution of the traffic (by detecting the number of axles and/or axle separation and categorising the vehicles accordingly).

The monitoring is provided using DAS which is relatively low cost and simple way of monitoring long lengths of road. A single optical fibre can be used to monitor a plurality of different noise features located at different locations along the length of the road to provide monitoring at various locations along the road. Noise features could be located at desired locations, say every few hundred meters or so along the length of a road with fibre optic cable running alongside the length of the road. Different sensing portions of optical fibre can thus be located in the vicinity of different noise features and thus the traffic passing over the noise feature can be monitored at a number of different locations along a very long stretch of road using a single DAS sensor and sensing fibre. The noise features, e.g. rumble strips are relatively very cheap and can be readily installed at any desired location along the road and thus the embodiments of the present invention allow low cost traffic monitoring with good road coverage.

It will be noted that the DAS sensor uses a sensing optical fibre which need not be embedded within the road being monitored. Thus unlike inductive loops, strain sensors or magnetic sensors or the like the sensor itself is not (necessarily) located in or on the road. Thus it is not subjected to the stresses and wear and tear of a busy roadway. Further any road works on the road being monitored, e.g. maintenance or repair of the road surface, or digging to access buried pipes etc., do not need to take account of sensitive sensing equipment requiring precise deployment. The sensing fibre optic cable may be laid alongside the road, and may for example be deployed in a protective casing that either runs alongside the side of the roadway or is buried in a trench running along the side of the road. In such arrangements the fibre optic cable could be accessed if required without requiring the road to be closed. It would of course be possible to implant the sensing fibre within the road if desired but unlike the conventional sensing technologies it is not necessary to do so. In some instances fibre optic cable may have already been installed running alongside at least part of the road for communications. Typically in such instances there may be spare optic fibres provided for redundancy reasons that may be able to be connected to a suitable interrogator and used for DAS without any further installation.

The noise features do need to be located on, or formed within the road, but various types of rumble strip are known and can be readily introduced. Rumble strips can be formed in the top surface of a road during laying of a road by stamping techniques. Rumble strips formed of a material such a plastic can laid across the road surface and bonded thereto, for instance by partial melting. Paint mixtures can be used to paint strips across the road which may be patterned to form a rumble strip. It will thus be understood that such noise features are relatively simple and low cost to install and need not be especially protected during any necessary road works as they can be readily reinstalled as part of laying the final road surface.

The use of DAS for monitoring a road networks in this way is thus particularly advantageous. As mentioned above a single DAS sensor can provide a contiguous series of sensing channels separated by 10 m or so for a length of up to 40 km or more and greater lengths can achieved by using more sensors. A single DAS interrogator unit may be multiplexed between two fibres to provide sensing over a distance of 80 km (with the interrogator in the middle). This offers an unrivalled continuity of sensing along the network. The sensing fibre may be standard telecoms fibre and thus is relatively cheap. As mentioned the fibre may be simply laid alongside the road or buried in a narrow channel at any depth required. The optical fibre can be encased in a protective casing and can survive for a long time with no maintenance. Thus installation and maintenance costs are low.

The optical fibre is interrogated by optical pulses generated by the interrogator unit and thus power is only needed for the interrogator units. The sensing mechanism inherently means that data from all sensing portions of the fibre is received back at the interrogator unit meaning that communication is only required between each interrogator unit and a traffic control room for active traffic management.

Figure 2:
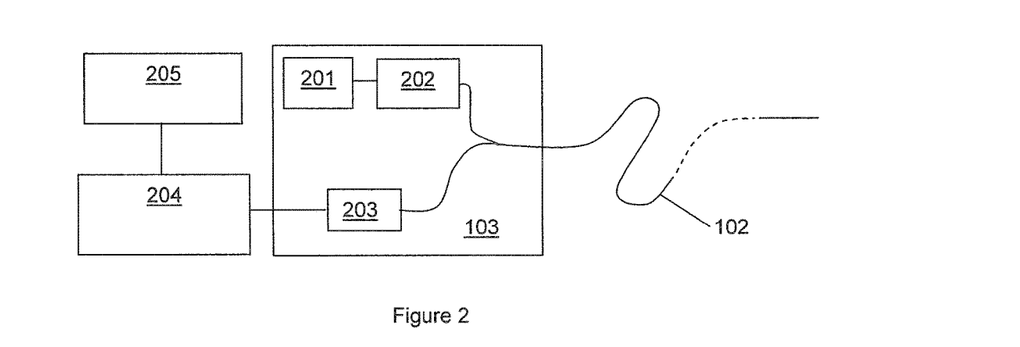
FIG. 2 illustrates a fibre optic distributed acoustic sensor.

FIG. 2 shows a schematic of a conventional distributed fibre optic sensing arrangement. The sensing fibre 102 is removably connected at one end to the interrogator 103. The output from interrogator 103 is passed to a signal processor 204, which may be co-located with, or form part of, the interrogator or may be remote therefrom, and optionally a user interface/graphical display 205, which in practice may be realised by an appropriately specified PC. The user interface may be co-located with the signal processor or may be remote therefrom.

As mentioned the sensing fibre 102 can be many kilometers in length and can be, for instance 40 km or more in length. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated to be especially sensitive to incident vibrations.

In operation the interrogator 103 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 201 and at least one optical modulator 202 for producing a plurality of optical pulses separated by a known optical frequency difference. The interrogator also comprises at least one photodetector 203 arranged to detect radiation which is Rayleigh backscattered from the intrinsic scattering sites within the fibre 102. A Rayleigh backscatter DAS sensor is very useful in embodiments of the present invention but systems based on Brillouin or Raman scattering are also known and could be used in embodiments of the invention.

The signal from the photodetector is processed by signal processor 204. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre of the order of 40 km say provides 4000 independent acoustic channels or so deployed along the 40 km of fibre.

Figure 3:
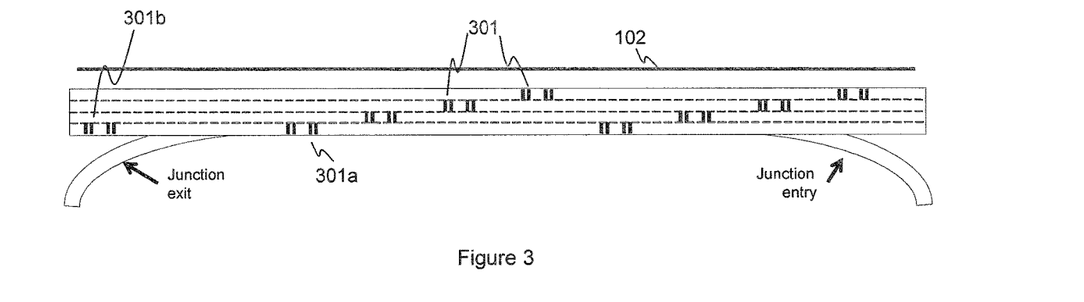
FIG. 3 illustrates an embodiment of the invention for monitoring a multi-lane road between two junctions.

As mentioned above this provides the ability to monitor long lengths of road using a single DAS sensor but with multiple noise features at different positions along the road, in other words there may be a plurality of known noise features located on or formed in the surface of the road in different known locations. FIG. 3 illustrates the principles of monitoring a section of freeway/motorway which may be several hundreds of meters or kilometers in length. Thus sensing fibre 102 may be deployed alongside the monitored section of road as described above. FIG. 3 illustrates that there may be multiple noise features 301, which in this example comprise four transverse rumble strips, located at different distances, i.e. locations, along the length of the road. The noise features 301 may be located at any position as desired and may for example be arranged to allow monitoring of a particular stretch of road between junctions. In particular there may be one noise feature 301a located before a junction, in this example an exit, and a second noise feature 301b located after the junction. The traffic flow from before and after the exit can thus be monitored to determine the amount of traffic exiting at that junction. The characteristic acoustic signatures from the different noise features at different locations along the length of the road can then be detected by different sensing portions of the optical fibre.

FIG. 3 also illustrates that road being monitored may be a multi-lane road. Typically the noise features may be arranged in one lane only so that only traffic passing in that lane will generate an acoustic response. This allows identification of which lane a vehicle is in. The noise features 301 may be staggered sufficiently far apart so that a given sensing portion of optical fibre will only detect a strong acoustic response from one noise feature. Thus a detection of a characteristic acoustic signal at a given sensing portion would indicate a vehicle passing the noise feature at that location and it would be known which lane such a noise feature is located in. Spacing the noise features so far apart may not be suitable in all instances however vehicles may change lanes between noise features and either not be counted or possibly be counted twice.

In one embodiment however at least some of the plurality of noise features are configured to produce different characteristic acoustic signatures to one another. In other words the signal produced by a vehicle traversing a first noise feature may be different from that produced if the same vehicle had traversed a second noise features. This can allow the processor to identify the particular characteristic acoustic signature so as to detect the relevant noise features which a vehicle has traversed. In particular if different noise features in different lanes are arranged to produce different acoustic signatures then by analysing the signals detected the relevant noise features producing the signal, and hence the relevant lane the vehicle is in, can be identified even from returns from a single sensing portion of optical fibre. The processor may therefore identify the particular characteristic acoustic signature to determine which lane a vehicle is travelling in.

There are various ways in which different acoustic signals could be produced but in one embodiment at least some noise features each comprise a plurality of noise elements spaced apart from one another along the road, each noise element being configured to generate a distinct sound when traversed by a wheel of a road vehicle wherein at least some noise elements have different spacing of noise elements from one another to generate said different characteristic acoustic signatures.

Figure 4:
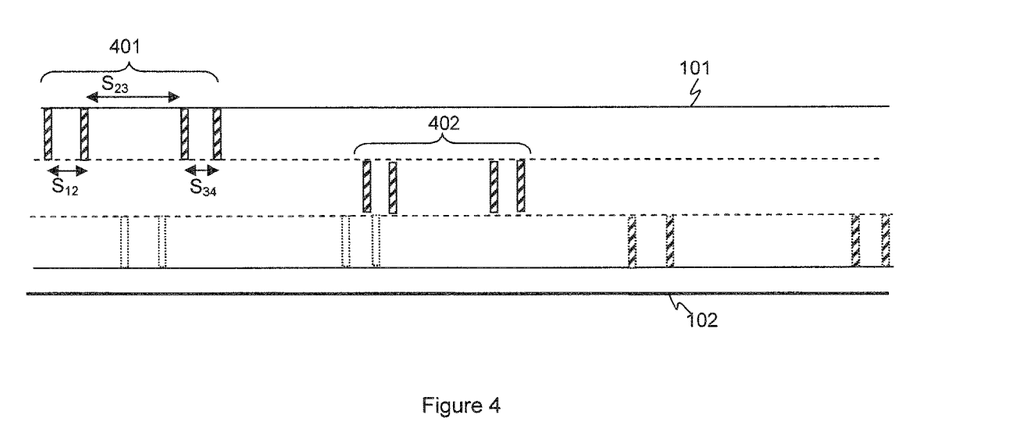
FIG. 4 illustrates an embodiment of the invention for discriminating between lanes of a multilane road.

FIG. 4 illustrates such an embodiment. In this example a noise feature 401 comprises four elements each of which will produce a distinct sound when traversed by the wheel(s) of a vehicle axle, for example four transverse rumble strips. These four elements are spaced from one another along the road in a desired pattern of spacing. Thus a vehicle crossing over all four elements will, assuming constant speed, produce a characteristic series of acoustic intensity spikes. The absolute timing between the intensity spikes will vary depending on the speed of the vehicle but the relative timing will be proportional to the spacing, i.e. the distance $S_{12}$ between the first and second elements, the distance $S_{23}$ between the second and third elements and the distance $S_{34}$ between the third and fourth elements. In effect the spacing of the noise elements imparts a relative timing coding to the acoustic signal generated by a vehicle at a constant speed. This spacing or coding may be different to that of a different noise feature 402 located in a different lane of the road.

There are various different ways in which the spacing of the various elements could be used to provide different characteristic acoustic signals. For example consider that for feature 401 the spacing $S_{12}$ is the same as the spacing $S_{34}$ but the spacing $S_{23}$ is a larger spacing, say twice the $S_{12}$ spacing. For feature 402 the spacing $S_{12}$ and $S_{34}$ may also be the same as each other and the same as the spacing for feature 401 but the spacing $S_{23}$ may be a different value, say three times the $S_{12}$ spacing. A vehicle travelling over feature 401 would therefore produce four intensity peaks from each axle with the relative delays between intensity peaks being in the ratio 1:2:1 whereas for feature 402 the ratio would be 1:3:1. By looking at the various intensity peaks it would therefore be possible to correlate the detected signals even from multiple noise features with the known patterns of those features in order to determine the characteristic signatures from each noise feature.

The various noise features may be at least partly staggered from one another by the order of a few meters of so to aid in distinguishing the various intensity peaks but as illustrated in the bottom lane in FIG. 4 in some instances the spacing of the elements of the noise features may at least partly overlap.

The noise features may be arranged so that the noise features in each lane produce the same characteristic signature which is different to that produced in other lanes. In other words there may be a first plurality of noise features each producing a first characteristic acoustic signature located at intervals along a first lane and a second plurality of noise features each producing a second characteristic acoustic signature located at intervals along a second lane.

Additionally or alternatively at least some noise elements may have different numbers of noise elements from one another to generate said different characteristic acoustic signatures and/or the at least some noise features may have different types of noise elements from one another to generate different distinct sounds when traversed.

Figure 5:
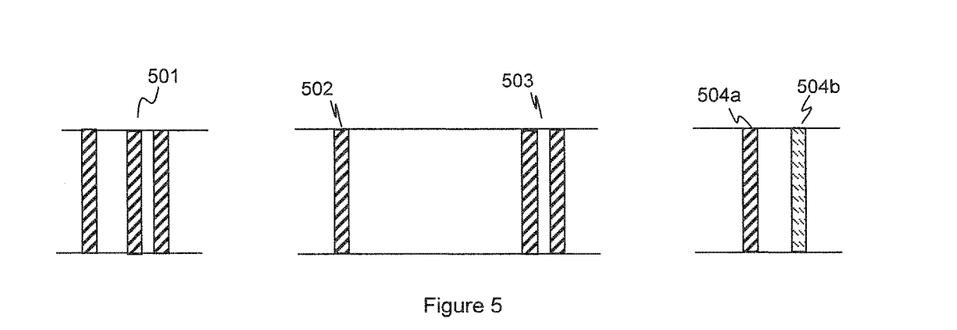
FIG. 5 illustrates alternative embodiments for noise features according to the present invention.

FIG. 5 illustrates some other embodiments of possible noise features. Noise feature 501 illustrates a noise feature having a non symmetrical arrangement of noise elements. This type of noise feature has the property that the pattern of sounds produced will vary depending on the direction of travel of the vehicle. Such a noise feature could therefore be arranged across the whole width of a two way road to monitor traffic moving in both directions, the direction of travel being indicated by the pattern of sounds produced.

Noise feature 502 has a single rumble strip element. This could be used in conjunction with general DAS based vehicle tracking, i.e. tracking the general noise generated by a moving vehicle across several sensing portions of the DAS sensor to identify vehicle location and speed to provide the advantages described above.

Another noise feature may feature a single noise element, such as element 503, located relatively far away from a plurality of other elements 503. The separation between the single element 502 and the plurality of elements 503 may be sufficiently far such that a vehicle must completely pass the single strip before reaching the plurality of elements (or vice versa). The pattern of sounds detected from the single strip will therefore simply indicate the axle pattern of the vehicle which may aid in processing of the returns from the plurality of strips.

Noise feature 504 is made up of a first element 504a of a first construction and a second element 504b of a second, different construction. The different construction could be that the second element may be formed from different material, and/or have a different patterned surface or varying surface profile so that it generates a different sound when traversed to the first element. By varying the type and/or order of the elements between the noise features it may be possible to provide different acoustic characteristics such as intensity, duration and/or acoustic frequency. The relative width of noise elements may also be varied so that the sounds produced by wheels traversing the noise elements have different durations.

It should be noted that the sounds produced by vehicles traversing the noise features may well have particular spectral characteristics and the processor may well look for such characteristics, for instance by applying frequency analysis or filtering, to aid in detecting the acoustic signatures. In particular the sound generated by the noise feature may have different spectral characteristics to the general road noise produced by movement of the vehicle. The spectral characteristic may also vary depending on the type of vehicle, e.g. the larger types of a heavy goods vehicle may produce a different frequency response to the smaller tyres of a compact car. Spectral analysis may be used to aid in vehicle characterisation.

It should be noted that the DAS sensor may also be used to provide other acoustic monitoring in addition to detecting the acoustic signals generated by vehicles crossing the noise features. As mentioned movement of a vehicle on a road adjacent to a DAS sensing fibre will generate acoustic signals even in the absence of noise elements and these signals can be detected and possibly used to track the vehicle as it moves, by tracking an acoustic signal as it moves relative to the sensing portions of the optical fibre. The embodiments of the present invention thus could be seen as providing additional point based monitoring of vehicles as they cross defined features in the roads with the advantage of being able to identify which lane of a multi-lane road a vehicle is travelling in and provide an indication of the type of vehicle from determination of axle separation.

Even if not used for tracking of vehicles between noise features the DAS sensor can be used to provide general information about the noise levels and hence activity levels of sections of the road network without specify noise features and/or provide condition monitoring for the roadside infrastructure or detection of emergencies, for instance detecting significant acoustic/vibrational signals that may indicate a crash.

The roads being monitored may, even in the absence of noise features across the carriageway, be provided with rumble strips running longitudinally along the side of the carriageway for the usual purpose of providing an alert to drivers of vehicles drifting away from the carriageway. The DAS sensor would be able to detect the distinctive sound of a vehicle driving on or crossing the rumble strip at the side of the road. Such information could be useful in a number of ways. If there are numerous detections of vehicles crossing the edge of the carriageway at a given location this could indicate that drivers are avoiding something on the main carriageway such as debris or a pothole or the like. This may trigger an alert to inspect the relevant section of carriageway. Additionally or alternatively a tired driver may repeatedly drift onto the rumble strip at the edge of the road at different locations along the length of the road as the vehicle progresses. This may be lead to a repeated series of detections at successive locations along a road. Such a pattern may be detected, especially if coupled with tracking of the vehicle by monitoring the general noise as it passes the various sensing portions of the fibre (which may be easier at times of light traffic such as at night when tiredness may be more of an issue) and used to generate an alert.

In general however such data may be collected over a relatively long period of time and analysed to determine any trends, such as particular locations or times or day where vehicles tend to exist the main carriageway.

In general therefore embodiments provide methods and apparatus for traffic monitoring. The method may be implemented, at least partly, by one or more suitably programmed computers and embodiments of the invention may therefore at least partly be implemented by suitable computer software. The invention also relates to a suitable processor for analysing the data collected from a DAS sensor deployed alongside a road having suitable noise features deployed therein.

The invention also covers forming or deploying noise features in or on a road in a way suitable for allowing vehicle detection, speed determination and/or axle separation to be determined by a suitable acoustic sensor.

Embodiments of the invention have been described in respect of detecting the acoustic signals using DAS sensing. DAS sensing is particularly advantageous for the reasons set out above but it would be possible to use other types of acoustic sensor in the vicinity of the noise features.

Embodiments of the invention have been described in respect of road traffic monitoring but the general idea would also be applicable to rail networks by providing noise features on or attached to the rails of the rail network in certain locations to as to provide a characteristic acoustic signature as a train passes.

It should be noted that the above-mentioned embodiments illustrate rather than limit the invention, and that those skilled in the art will be able to design many alternative embodiments without departing from the scope of the appended claims. Features from various embodiments may be combined and used together except where expressly indicated otherwise. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of monitoring road traffic moving on a road comprising:
   interrogating an optical fibre with optical radiation to provide distributed acoustic sensing so as to generate an acoustic measurement signal from each of a plurality of sensing portions of said optical fibre;
   wherein at least one of said sensing portions of said optical fibre is positioned so as to detect acoustic signals generated by road vehicles traversing a known road noise structure formed as a distinct part of the surface of the road in a known location; and
   wherein said known road noise structure is configured to produce a characteristic acoustic signature when traversed by a wheel of a road vehicle, and
   the method comprises detecting vehicles passing over said road noise structure by analysing said acoustic measurement signal from said at least one sensing portion to detect occurrences of said characteristic acoustic signature.

2. A method as claimed in claim 1 wherein said road noise structure comprises at least one raised or patterned feature formed in the surface of the road.

3. A method as claimed in claim 1 wherein said road noise structure comprises one or more rumble strips arranged transversely to the road direction.

4. A method as claimed in claim 1 further comprising the step of associating occurrences of said characteristic acoustic signature with an axle of a road vehicle and identifying the number of axels of said road vehicle.

5. A method as claimed in claim 1 wherein said road noise structure comprises at least first and second noise elements spaced apart from one another along the road by a known first distance, wherein each of said first and second noise elements is configured to generate a distinct sound when traversed by a wheel of a road vehicle.

6. A method as claimed in claim 5 wherein the method further comprises identifying first and second acoustic signals respectively generated by the wheel or wheels of a given vehicle axle traversing the first and second noise elements.

7. A method as claimed in claim 6 further comprising determining the speed of the vehicle based on the time difference between said first and second acoustic signals.

8. A method as claimed in claim 7 further comprising determining the distance between axles of road vehicles based on the time between occurrences of said characteristic acoustic signature generated by the wheels of different axles of said road vehicle and said determined speed.

9. A method as claimed in claim 8 further comprising categorising the type of road vehicle based on the determined distance between axles of a road vehicle.

10. A method as claimed in claim 1 further comprising determining the acoustic intensity of said characteristic acoustic signature and categorising the type of road vehicle based on the determined acoustic intensity of said characteristic acoustic signatures.

11. A method as claimed in claim 1 wherein there are a plurality of known road noise structures formed as part of the surface of the road in different known locations and the method comprises detecting occurrences of the characteristic acoustic signature from any of the plurality of known road noise structures.

12. A method as claimed in claim 11 wherein a plurality of road noise structures are located at different locations along the length of the road and the optical fibre is deployed along the path of the road.

13. A method as claimed in claim 12 wherein the characteristic acoustic signatures from different road noise structures at different locations along the length of the road are detected by different sensing portions of the optical fibre.

14. A method as claimed in claim 13 wherein at least one road noise structure is located before a junction and at least one road noise structure is located after a junction.

15. A method as claimed in claim 11 wherein at least some of the plurality of road noise structures are configured to produce different characteristic acoustic signatures to one another.

16. A method as claimed in claim 15 wherein the method further comprises identifying the particular characteristic acoustic signature so as to detect the relevant noise features which a vehicle has traversed.

17. A method as claimed in claim 15 wherein at least some road noise structures each comprise a plurality of noise elements spaced apart from one another along the road, each noise element being configured to generate a distinct sound when traversed by a wheel of a road vehicle and wherein at least some road noise structures have different spacing of noise elements from one another to generate said different characteristic acoustic signatures.

18. A method as claimed in claim 15 wherein at least some road noise structures each comprise a plurality of noise elements spaced apart from one another along the road, each noise element being configured to generate a distinct sound when traversed by a wheel of a road vehicle and wherein at least some road noise structures have different numbers of noise elements from one another to generate said different characteristic acoustic signatures.

19. A method as claimed in claim 15 wherein at least some road noise structures each comprise a plurality of noise elements spaced apart from one another along the road, each noise element being configured to generate a distinct sound when traversed by a wheel of a road vehicle and wherein at least some road noise structures have different types of noise elements from one another to generate different distinct sounds when traversed.

20. A method as claimed in claim 15 wherein at least part of the road monitored is a multi-lane road and at least some of said road noise structures generating different characteristic acoustic signatures are located in different lanes from one another.

21. A method as claimed in claim 20 wherein the road comprises at least first and second lanes and there are a first plurality of road noise structures each producing a first characteristic acoustic signature located at intervals along the first lane and a second plurality of road noise structures each producing a second characteristic acoustic signature located at intervals along the second lane.

22. A method as claimed in claim 1 wherein at least part of the road monitored is a multi-lane road and wherein there are a plurality of road noise structures located along the path of each lane.

23. A method as claimed in claim 22 wherein the spacing between adjacent road noise structures are different in each lane.

24. A system for monitoring traffic movement on a road comprising:
   a distributed fibre optic sensor for interrogating an optical fibre with optical radiation to provide distributed acoustic sensing so as to generate an acoustic measurement signal from each of a plurality of sensing portions of said optical fibre; and
   at least one known road noise structure formed as a distinct part of the surface of the road in a known location;
   wherein said road noise structure is configured to produce a characteristic acoustic signature when traversed by a wheel of a road vehicle, and
   wherein at least one of said sensing portions of said optical fibre is positioned so as to detect acoustic signals generated by road vehicles traversing said known road noise structure;
   the system further comprising a processor for processing the acoustic measurement signal from the at least one sensing portion to detect occurrences of said characteristic acoustic signature so as to detect vehicles passing over said road noise structure.

* * * * *